United States Patent [19]

Capper et al.

[11] Patent Number: 5,785,548

[45] Date of Patent: Jul. 28, 1998

[54] POWER TAP NETWORK CONNECTOR

[75] Inventors: Harry Milton Capper; Sam Denovich; William Joseph Garver, all of Harrisburg, Pa.

[73] Assignee: The Whitaker Corporation, Wilmington, Del.

[21] Appl. No.: 968,832

[22] Filed: Nov. 13, 1997

Related U.S. Application Data

[63] Continuation of Ser. No. 615,572, Mar. 12, 1996, abandoned, which is a continuation-in-part of Ser. No. 573,175, Dec. 15, 1995, Pat. No. 5,667,402.

[51] Int. Cl.$^6$ ............................................... H01R 4/24
[52] U.S. Cl. ........................... 439/409; 439/341; 439/410
[58] Field of Search ................................ 439/341, 395, 439/404, 409, 410, 411, 417, 418

[56] References Cited

U.S. PATENT DOCUMENTS

| | | | |
|---|---|---|---|
| 4,283,105 | 8/1981 | Ferrill et al. | 339/97 R |
| 4,341,430 | 7/1982 | Crawford | 339/99 R |
| 4,426,125 | 1/1984 | Crawford | 339/99 R |
| 4,431,247 | 2/1984 | Abdullah et al. | 339/97 P |
| 4,461,528 | 7/1984 | Durand et al. | 439/409 |
| 4,496,206 | 1/1985 | Markwardt et al. | 339/98 |
| 4,684,195 | 8/1987 | Anderson et al. | 439/404 |
| 4,701,138 | 10/1987 | Key | 439/417 |
| 4,729,738 | 3/1988 | Heng et al. | 439/395 |
| 4,793,823 | 12/1988 | Cozzens et al. | 439/409 |
| 4,874,329 | 10/1989 | Yu | 439/409 |
| 4,995,829 | 2/1991 | Geib et al. | 439/409 |
| 4,995,830 | 2/1991 | Eckhaus | 439/409 |
| 5,120,246 | 6/1992 | Knox | 439/402 |
| 5,154,633 | 10/1992 | Lee | 439/409 |
| 5,195,907 | 3/1993 | Urban | 439/410 |
| 5,360,352 | 11/1994 | Rudy, Jr. et al. | 439/469 |
| 5,450,469 | 9/1995 | Pamart et al. | 379/27 |
| 5,484,304 | 1/1996 | Capper et al. | 439/409 |

FOREIGN PATENT DOCUMENTS

| | | |
|---|---|---|
| 0 195 879 A1 | 7/1985 | European Pat. Off. . |
| 0 427 132 A2 | 11/1990 | European Pat. Off. . |
| 2 626 124 | 7/1989 | France . |
| 3333973 A1 | 9/1983 | Germany . |
| 2 129 630 | 5/1984 | United Kingdom . |

*Primary Examiner*—J. J. Swann
*Attorney, Agent, or Firm*—Mary K. VanAtten; Salvatore Anastasi

[57] ABSTRACT

The invention comprises a power tap connector of the type for terminating by insulation displacement a pair of conductors. The connector includes a housing for receiving at least a pair of upstanding IDC terminals. A pivotally mounted conductor wire carrier has front and rear faces arranged on the housing. The wire carrier is pivotal from a first conductor unterminated position to a second conductor terminated position. The wire carrier has a conductor receiving opening extending from the front face to the rear face for each the IDC terminal. An IDC terminal receiving slot is in communication with each opening, whereby an insulated conductor may be positioned for termination to a corresponding IDC terminal within the opening by entry thereto through either the front face or the rear face.

11 Claims, 8 Drawing Sheets

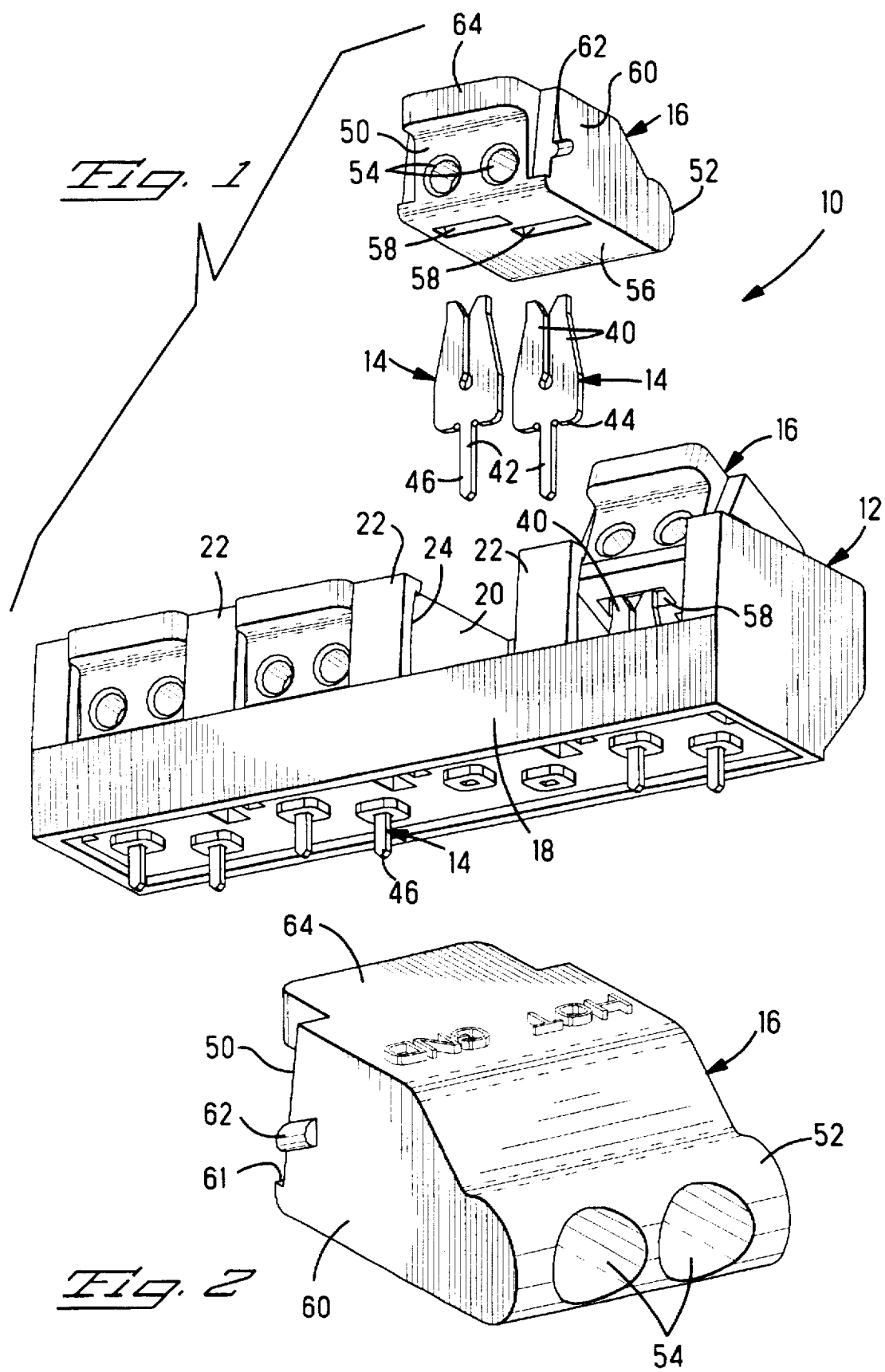

POWER TAP NETWORK CONNECTOR

This application is a Continuation of application Ser. No. 08/615,572 filed Mar. 12, 1996, now abandoned, which is a continuation-in-part of Ser. No. 08/573,175 filed Dec. 15, 1995, now U.S. Pat. No. 5,667,402.

RELATED INVENTION

This application, directed to a field terminated network connector, represents an improvement to U.S. Pat. No. 5,667,402 where the contents thereof are incorporated herein by reference.

BACKGROUND OF THE INVENTION

The present invention relates to a simplified concept for terminating signal conductors to a network interface device. Network interface devices as known in the art, provide limited access by a subscriber or customer for testing by the subscriber of the subscriber premises wiring, at a telephone junction box for example, where the subscriber premises wiring is connected to circuits of the telephone service provider. Such junction boxes are also fully accessible to service personnel of the telephone company after installation. One such network interface device is disclosed in U.S. Pat. No. 4,979,209 for a plurality of subscribers, wherein an enclosure includes a primary lid extending over the entire enclosure and securable by service personnel, and a secondary lid over the subscriber-accessible portion of the enclosure securable by the subscribers; such enclosures commonly provide access to the subscriber-accessible portion by service personnel but the subscriber-accessible portion remains secured against unauthorized person. Individual modules within the subscriber-accessible portion are disclosed to include individual security covers such that each subscriber module is secured against access by the other subscribers.

In U.S. Pat. No. 5,420,920 there is disclosed a subscriber module having a test port or jack in which pairs of contacts are interconnected by a dedicated plug inserted thereinto to complete circuits between the telephone cable and the premises wiring for regular inservice use. When the dedicated plug is removed during an investigation of a fault, another plug joined to a telephone unit is insertable by the subscriber to again complete the circuits to determine the presence or absence of a fault in the telephone company wiring. The dedicated plug of the module is adapted to seal the jack cavity when in position, protecting the contacts exposed in the jack, and is joined to the module by a lanyard when removed from the jack. Conductors of the premise wiring are easily terminatable by insulation displacement techniques to terminals using a stuffer cap, with the terminals connected to first contacts of the jack contact pairs by circuit board traces, while second contacts of the pairs are connected by other board traces to conductors connected to the distribution cable.

In the parent co-pending application, there is disclosed an improved network connector that utilizes a pivotal IDC stuffer modular member for a pair of conductors, such as the tip and ring wires to a network interface device module. The module, for example, includes a module or housing to which are affixed a pair of wire carriers at respective wire termination sections. Each wire carrier is affixed to the modular housing at a pivot section enabling pivoting of the wire carrier between wire insertion and wire termination positions. Preferably each of the wire carriers includes two passageways, one for each of the tip and ring conductors, so that both the tip and ring wires may be terminated simultaneously. Terminals for the tip and ring wires are mounted on a circuit element of the module contained within the housing, and include wire termination sections extending into slots in a housing-proximate surface of a wire carrier that intersect the passageways. When the wire carrier is in the open position, the wire is insertable past the terminal to a passageway end indicating full insertion; when both wires have been inserted, the wire carrier is pivoted to a closed position forcing the wires into slots of the wire termination sections of the terminals. A limitation of such interface device is that the tip and ring wires are inserted from only a single face, which, for example, can limit the use of an intermediate sealant gel.

The present invention employs a redesigned device that allows for wire insertion or loading from opposing ends of a pivotal stuffer member, and by the provision of a separate sealant means that can be incorporated into the device. The manner by which this can be achieved will become apparent in the specification which follows, particularly when read in conjunction with the accompanying drawings.

SUMMARY OF THE INVENTION

The present invention is directed toward a power tap connector of the type for terminating by insulation displacement a pair of conductors. The connector includes a housing for receiving at least a pair of upstanding IDC terminals. A pivotally mounted wire carrier has front and rear faces arranged on the housing. The wire carrier is pivotal from a first conductor unterminated position to a second conductor terminated position. The wire carrier having a conductor receiving opening extending from the front face to the rear face for each the IDC terminal. An IDC terminal receiving slot is in communication with each said opening. Whereby an insulated conductor may be positioned for termination to a corresponding IDC terminal within the opening by entry thereto through either the front face or the rear face.

BRIEF DESCRIPTION OF DRAWINGS

Embodiments of the present invention will now be described by way of example with reference to the accompanying drawings, in which:

FIG. 1 is a bottom perspective view of an exemplary four position power tap network connector according to this invention, where the two left modules illustrating a terminated position, less wires, the right module representing the wire receiving or unterminated position, and the intermediate module showing the components thereof in an exploded position;

FIG. 2 is a perspective view of the pivotal stuffer member for mounting in the connector housing;

DETAILED DESCRIPTION OF PREFERRED EMBODIMENTS

The present invention relates to a field terminated, power tap network connector 10, the elements thereof being illustrated in a first embodiment in FIG. 1. The connector 10 comprises a modular housing 12, with each modular unit thereof adapted to receive a pair of IDC terminals 14, and a wire carrier 16 arranged for pivotal movement on the housing 12.

Figure 3:
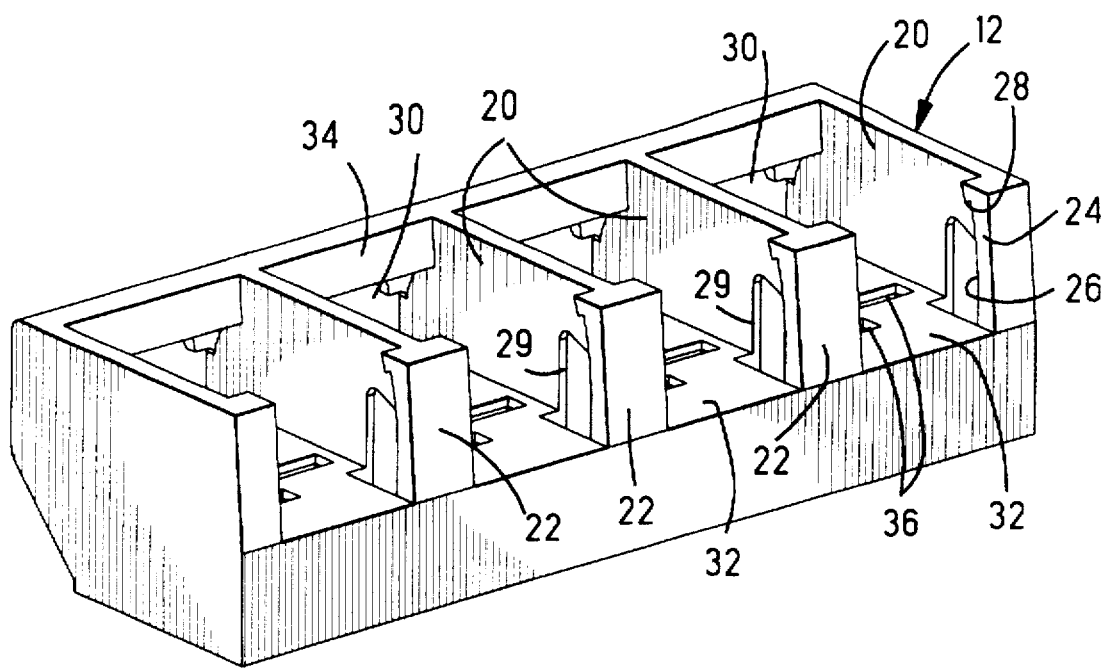
FIG. 3 is a top perspective view of the connector housing of a typical four position power tap network connector according to this invention.
Figure 4:
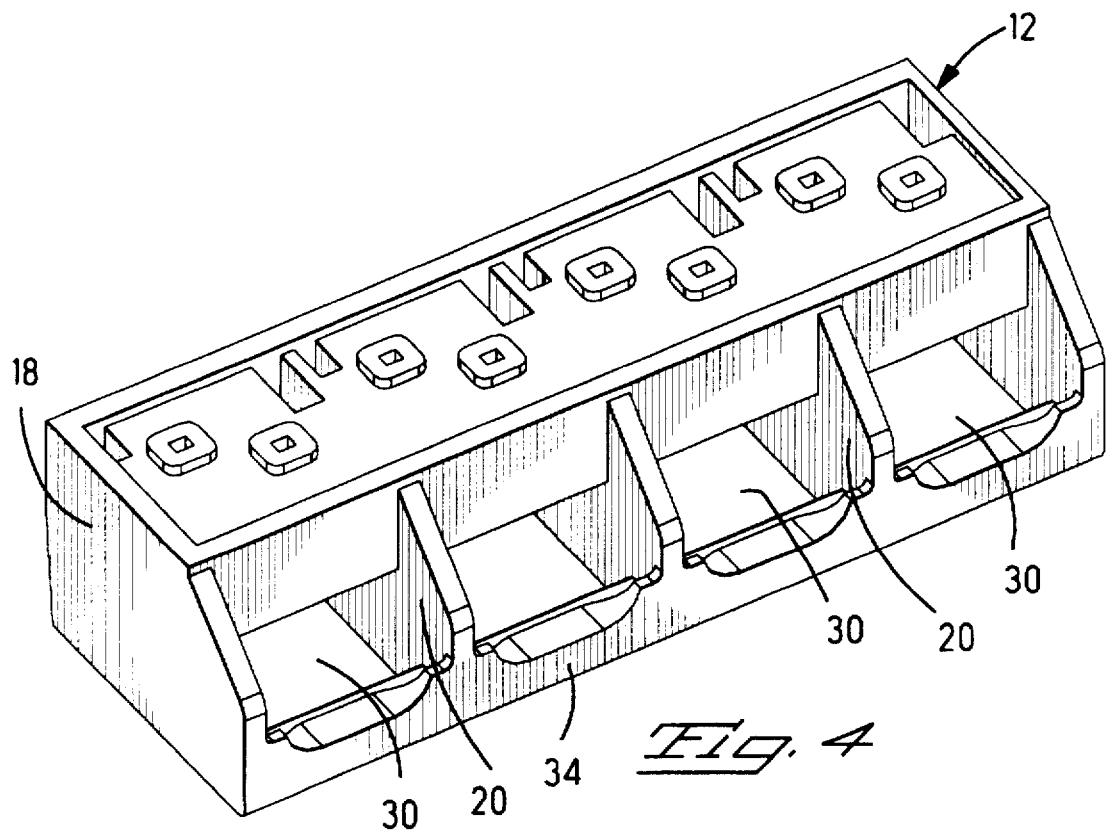
FIG. 4 is a bottom perspective view of the connector housing of FIG. 3.
Figure 5:
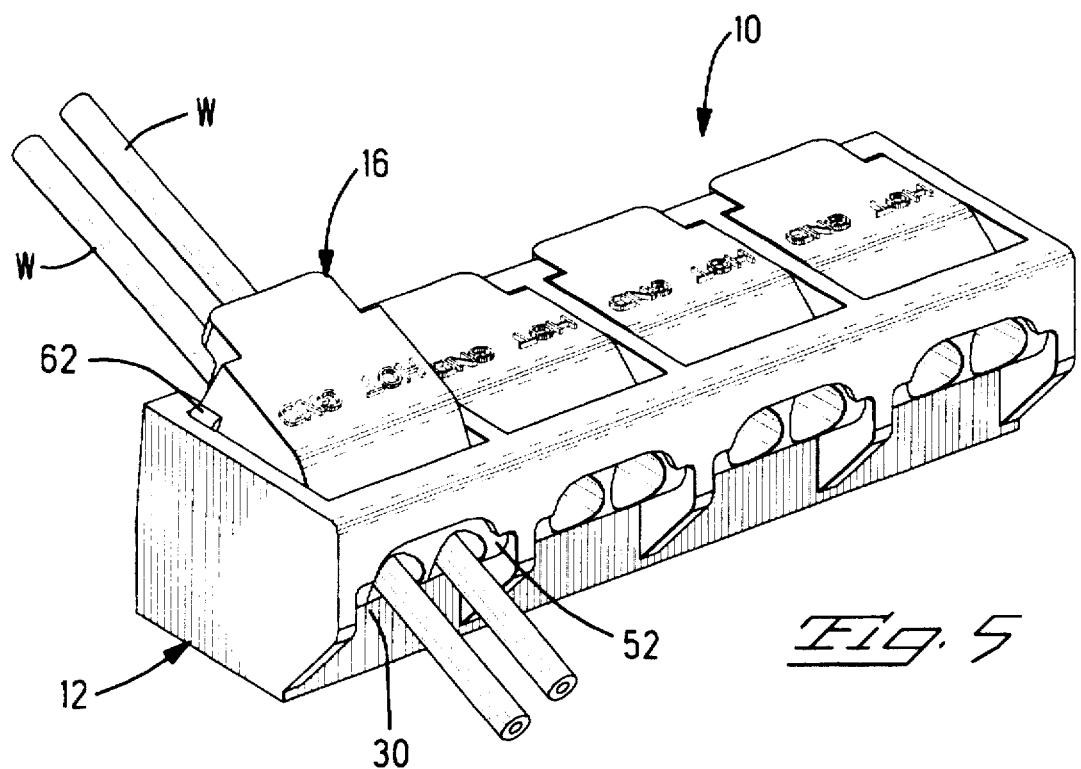
FIGS. 5 and 6, respectively, are top and bottom perspective views showing a pair of insulated conductors positioned for IDC termination therewithin.
Figure 6:
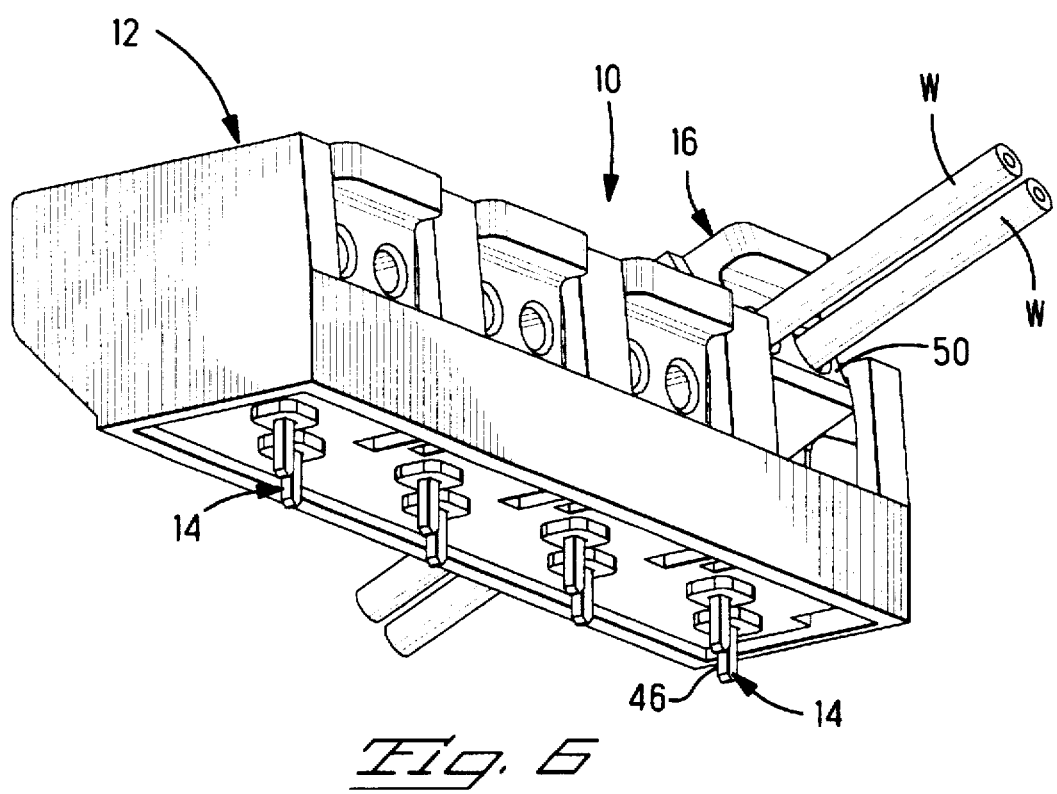

The modular housing 12, where four units are illustrated in the top and bottom perspective views of FIGS. 3 and 4, respectively, comprises a base 18 having upstanding end or intermediate walls 20 to separate the respective modular units. The modular housing further includes a segmented front wall 22 (FIGS. 1 and 3), where such wall segments terminate the respective intermediate or end walls 20. Such segmented front walls 22 include an inwardly facing shoulder 24 having an arcuate face 26 ending in a stop 28, which as will be apparent in the later description, that defines the pivotal arc or path of movement for the pivotally mounted wire carrier 16. Further, the respective walls 20, adjacent the shoulder 24, include a recess 29 to receive a cam guide, as described hereinafter, on the sides of the pivotal wire carrier.

The rear of the housing 12, as best seen in FIGS. 3, 4, 5 and 7 includes an opening 30, where such opening is defined by the respective walls 20, floor 32 of base 18, and a rear wall segment 34 which acts as a complementary pivot member. The significance of the opening 30 will become apparent hereinafter. Finally, the housing 12, through its base 18, is provided with plural terminal slots 36 for receipt of the IDC terminal 14 shown in FIG. 1.

The IDC terminal, illustrated as poised for entry into the housing base 18 in FIG. 1, consists of a stamped metal contact having a pair of IDC split beam legs 40, a solder tail 42, and a shoulder 44 defining the two portions. In the assembly of the connector, with the plane of the legs longitudinally arranged, the solder tail 42 is press fit into and seated within a respective slot 36, with the ends 46 projecting below the base. In this position the housing may be mounted on a suitable planar electronic device, such as a printed circuit board, and the terminal ends 46 soldered to appropriate circuit carrying plated through holes in the device.

The wire carrier 16, illustrated in the isolated position in FIGS. 1 and 2, comprises a body portion having an essentially flat front face 50, a curved rear face 52 which acts as a pivot member, and a pair of through openings 54, extending between the respective faces, for receiving a pair of wires, i.e. power and ground or tip and ring, for example. Communicating with said openings 54, through the bottom wall 56 thereof, are a pair of slots 58, typically offset from one another, for receiving the split beam legs 40 during termination of the subscriber wires, see FIG. 1. To effect pivoting or arcuate movement of wire carrier 16, the rear face 52 is made semicylindrical and sized to pivotally move within the opening 30 under the rear wall segment 34. Toward the front face 50, along each side 60, a cam follower 62 is provided to seat within the recess 29 during the pivoting movement of the wire carrier 16. Finally, the wire carrier may be provided with a forward flanged portion 64 to facilitate movement, particularly during untermination of the system, of the wire carrier 16.

Figure 7:
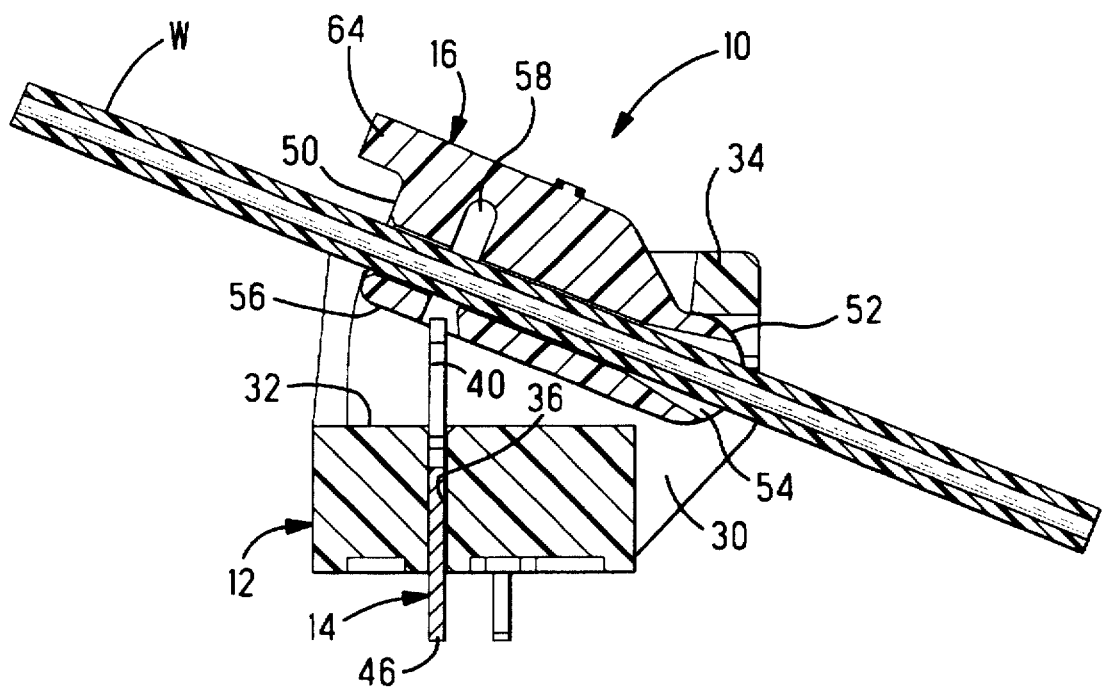
FIG. 7 is a sectional view taken longitudinally through the wired module of FIGS. 5 and 6.
Figure 8:
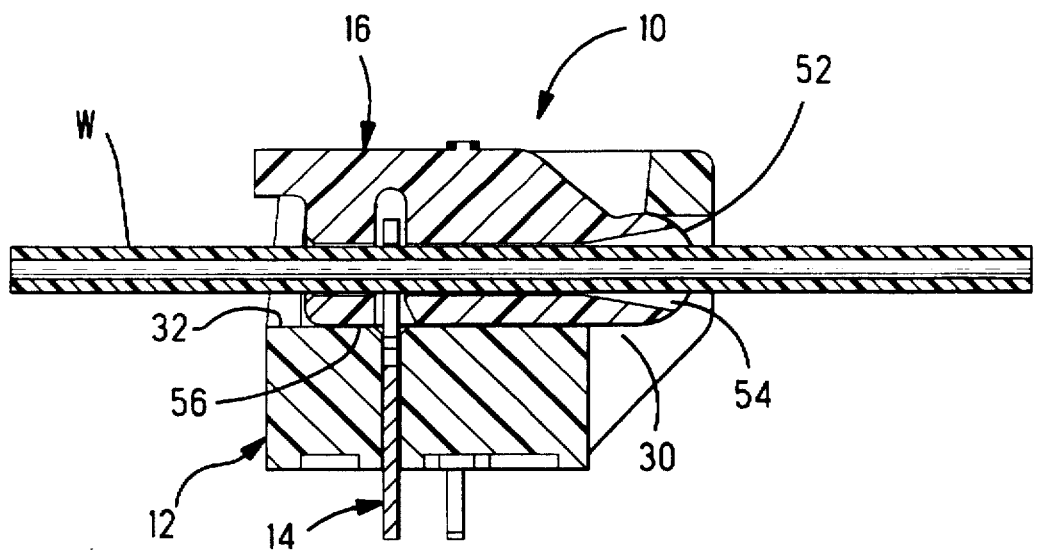
FIG. 8 is a sectional view, similar to FIG. 7, showing the IDC terminated position.

FIGS. 5 to 8 illustrate a unique feature of this invention, namely the accessibility of loading the power and ground wires or the tip and ring wires "W", or some other type of premise wiring, for example, from either the front face 50 or rear face 52. FIGS. 7 and 8 show sequentially the termination of the wires "W". FIG. 7 shows the wire carrier 16 in the first or wire insertion position in which the wires may be loaded into the wire carrier. Once the wires are loaded into the wire carrier 16, with the slots 58 overriding the respective legs 40 of the IDC terminals 14, the wire carrier 16 is pivoted downwardly such that the bottom wall 56 thereof rests against the housing floor 32. This is the second or wire termination position. As this movement takes place, the wires "W" are stuffed between the respective legs 40 where the insulation of the wire is displaced and the core thereof electrically contacts the walls between such legs. Simply moving or pivoting the wire carrier 16 upwardly will effect untermination of the wires "W".

When the wire carries 16 is in the unterminated position, the cam guide 62 is above the walls 20 and provides resistance against downward movement of the wire carrier. A front shoulder 61 of the wire carrier (see FIG. 2) abuts against the stop 28 thereby preventing the wire carrier from being rotated into a more vertical position. When the wire carrier 16 is pushed into the terminated position, the cam guide 62 is pushed down until it resides within the recess 29 thereby securing the wire carrier in the terminated position. The cam guide 62 provides enough resistance to the wire carrier to keep it in the desired position, however, it allows the wire carrier to be easily moved by the operator using only his hands.

The power tap connector illustrated is specifically designed to provide a connection for the power conductors on a coax cable. The signal and power from the coax cable are split in a tap utility box on the utility pole and they are separately sent to the customer's home to provide both the signal to the home and also the power to operate the customer's box. The power from the coax cable is directed through the circuit board upon which the power tap connector is mounted and connected to the solder tails 42. Since the tap box is mounted on a utility pole, it must be protected from the weather. In order to accomplish this, it is necessary to seal the exit points for the power wires.

Figure 9:
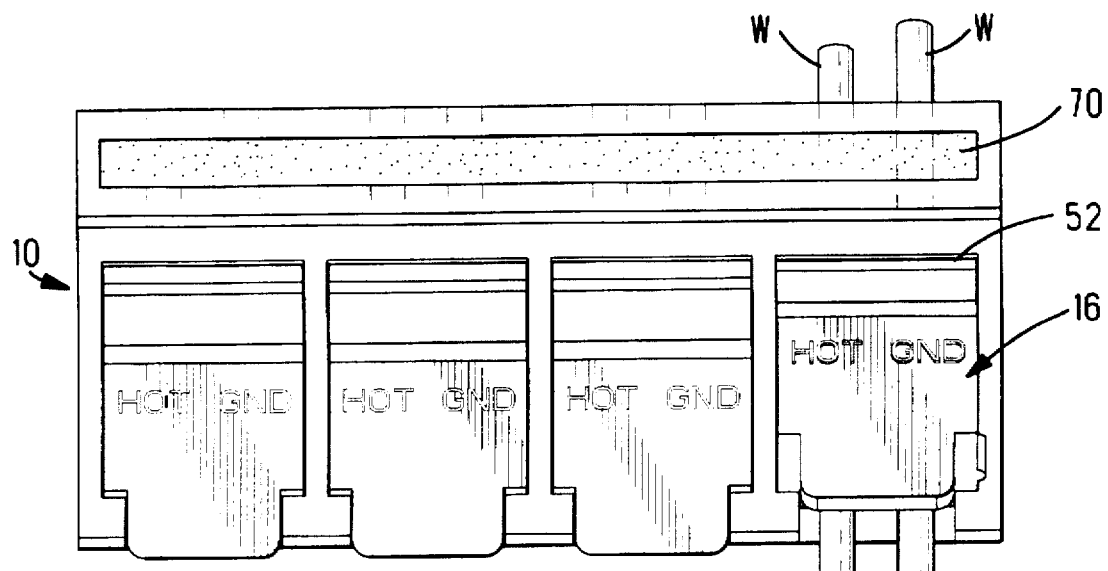
FIG. 9 is a top view of the four position power tap connector of this invention, modified with a gel sealant chamber adjacent the rear end thereof.
Figure 10:
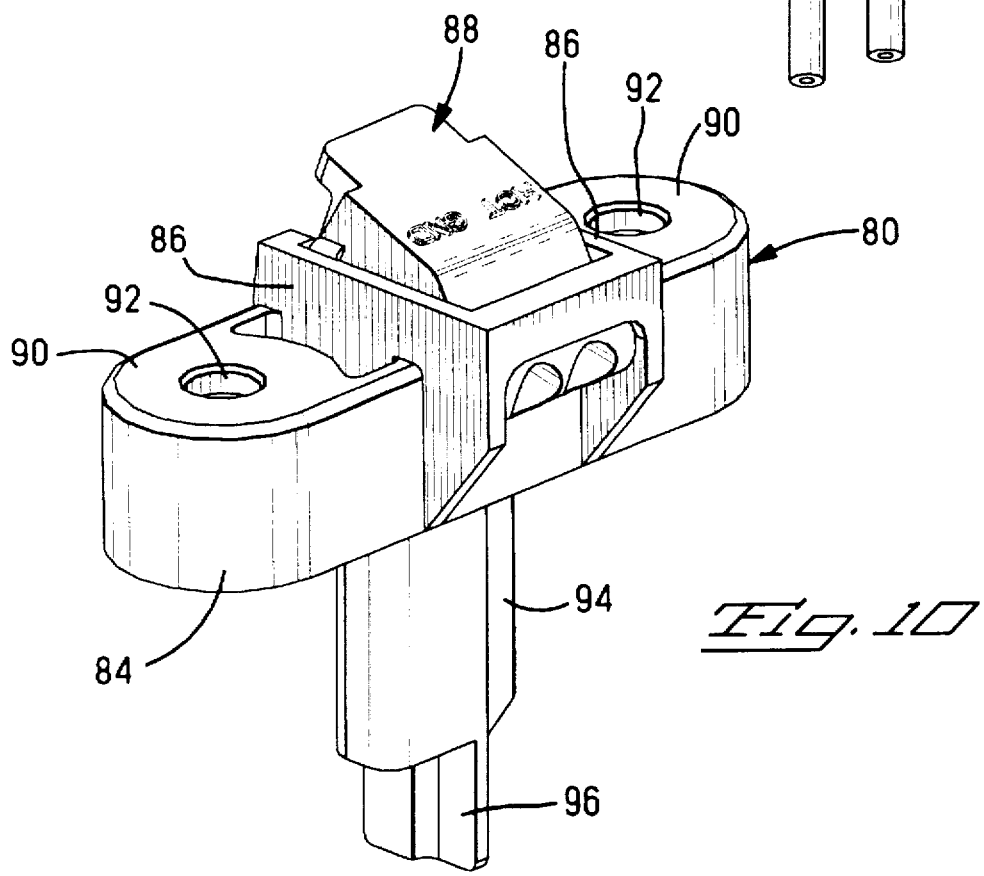
FIG. 10 is a rear perspective view of a second embodiment of the invention, where such embodiment is directed to a single position connector.
Figure 11:
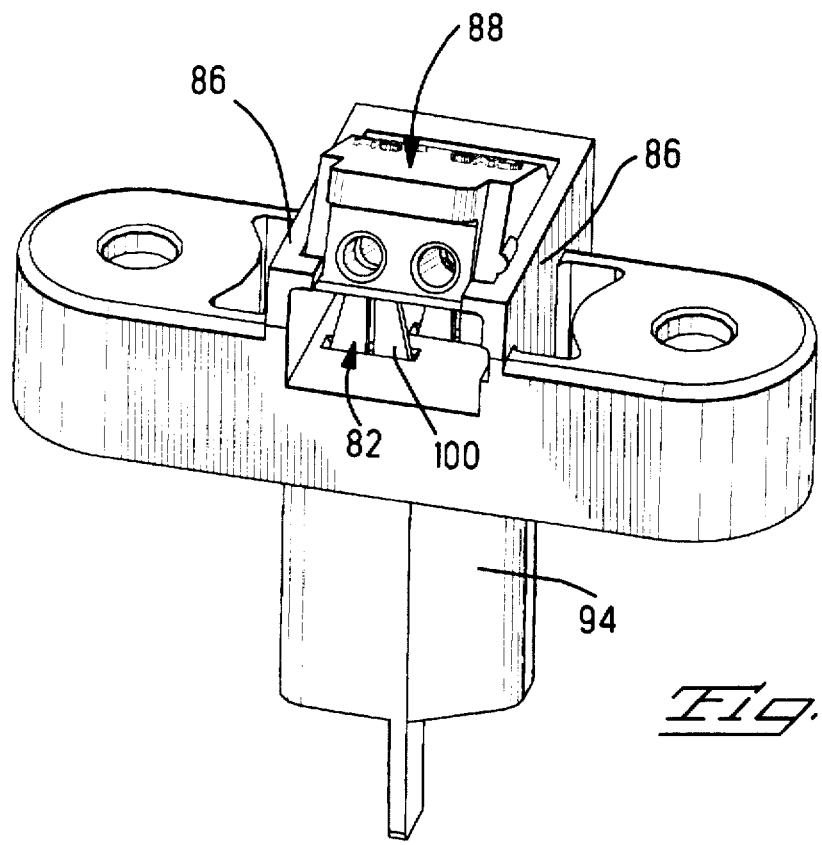
FIG. 11 is a front perspective view of the embodiment of FIG. 10.

One of the advantages of this dual loading system of the present invention is illustrated in FIG. 9. Here, a reservoir 70, containing a semi-fluid, self-healing gel, such as a hydrocarbon based sealant, may be incorporated. FIG. 9 represents the tap box. The reservoir 70 is in the wall of the tap box through which the power wires will extend. The power tap connector will be mounted on the inside of the box along an outer wall of the box and the wires will extend through the walls and through the reservoir 70. A gel suitable for practicing this invention is described in U.S. Pat. No.

5,360,350. The nature of this type of gel allows loading of the wires "W" initially through the gel, then into the wire carrier 16 through the rear face 52. By placing the gel reservoir 70 adjacent the pivoting rear face 52, there is little disturbance about the wires "W" and that the self-healing nature of the gel maintains an effective seal thereabout. Were the reservoir placed adjacent the opposite end of the wire carrier, one can see that the gel would be disturbed significantly during termination and untermination thereby effecting its ability to seal the wires.

Figure 12:
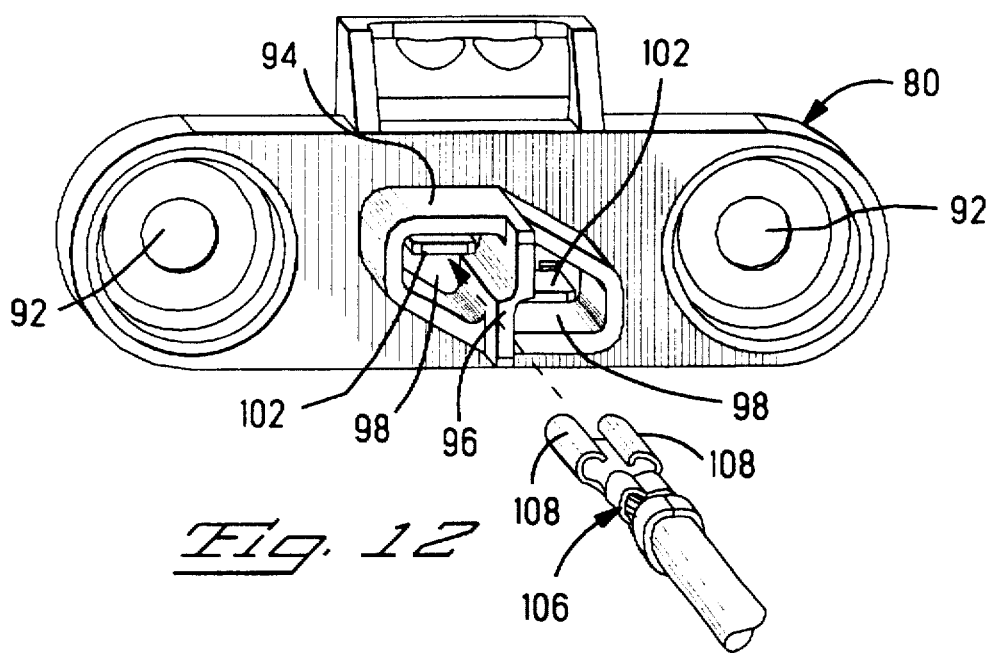
FIG. 12 is a bottom perspective view of the single position embodiment of FIGS. 10 and 11.
Figures 13, 14:
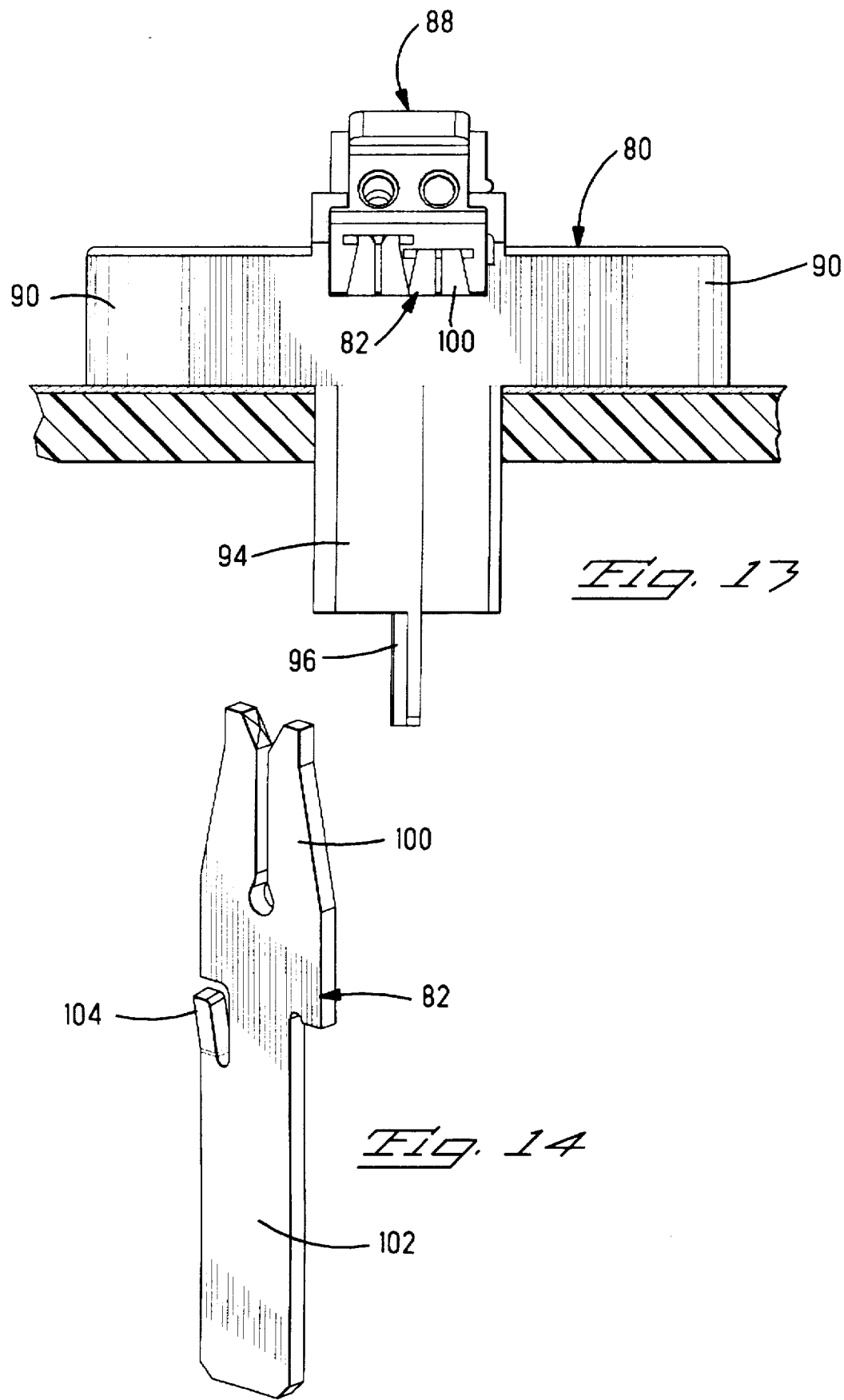
FIG. 13 is a front view of the second embodiment showing a preferred mounting procedure.
FIG. 14 is a perspective view of an alternate type of terminal that may be used herein, particularly for the single position second embodiment.

FIGS. 10 to 14 illustrate a second embodiment, which is distinguishable from the earlier embodiment by the use of a single power tap connector 80, and by the use of a modified IDC type terminal 82, see FIG. 14. Specifically, the single power tap connector 80 includes a housing 84 having a pair of spaced apart transverse walls 86 between which is a pivotally mounted wire carrier 88, constructed in a manner described above. The housing 84 further includes lateral extensions 90, with through holes 92 therein, for mounting to an underlying board or panel, for example, see FIG. 13. Extending below the housing is a contact receiving extension 94, where such extension includes a cavity dividing wall 96. Note in FIG. 12, an underside perspective view, that a pair of contact receiving cavities 98 are found.

The preferred type of male terminal 82 to be used herein is illustrated in FIG. 14. Such male terminal 82 includes an IDC slotted beam 100 at one end thereof, and a flat bladed end 102. For securing same into the housing 84, a lance 104 may be struck therefrom for latching engagement in the housing. A typical female or complementary contact 106 is illustrated in FIG. 12. Briefly, the contact 106 includes a pair of inwardly turned arms 108 for engagement with the bladed end 102. For a more detailed discussion of such complementary contacts, reference is made to U.S. Pat. No. 2,774,951, assigned to the assignee hereof, where the contents thereof are incorporated herein by reference.

This single power tap connector offers the same unique advantages as noted above, that is, the wire carrier 88 may be loaded from either the front face, or the rear pivoting face. The single power tap connector is typically mounted in the customer's home to provide the connection of the power wires from the utility tap box which is mounted on the utility pole.

Figure 15:
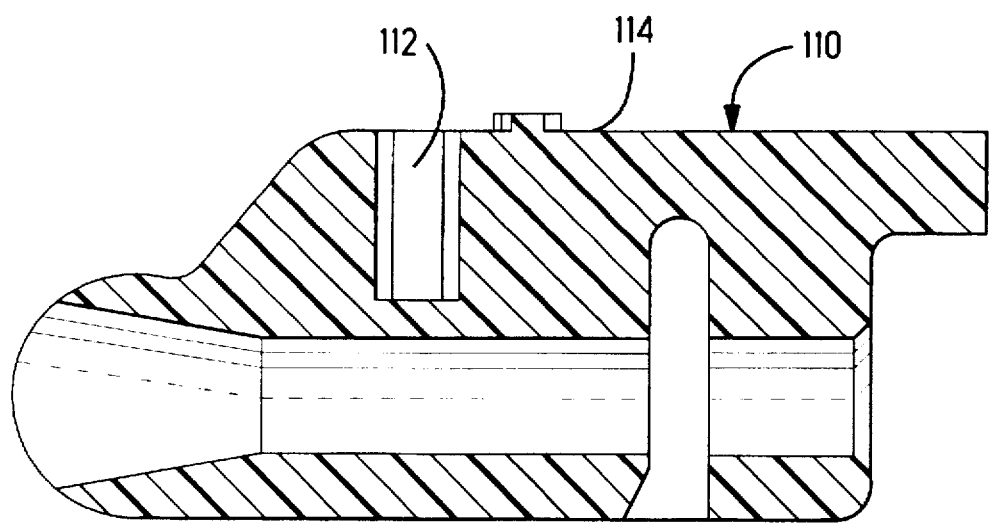
FIG. 15 is a cross sectional view of an alternate embodiment of the wire carrier.
Figure 16:
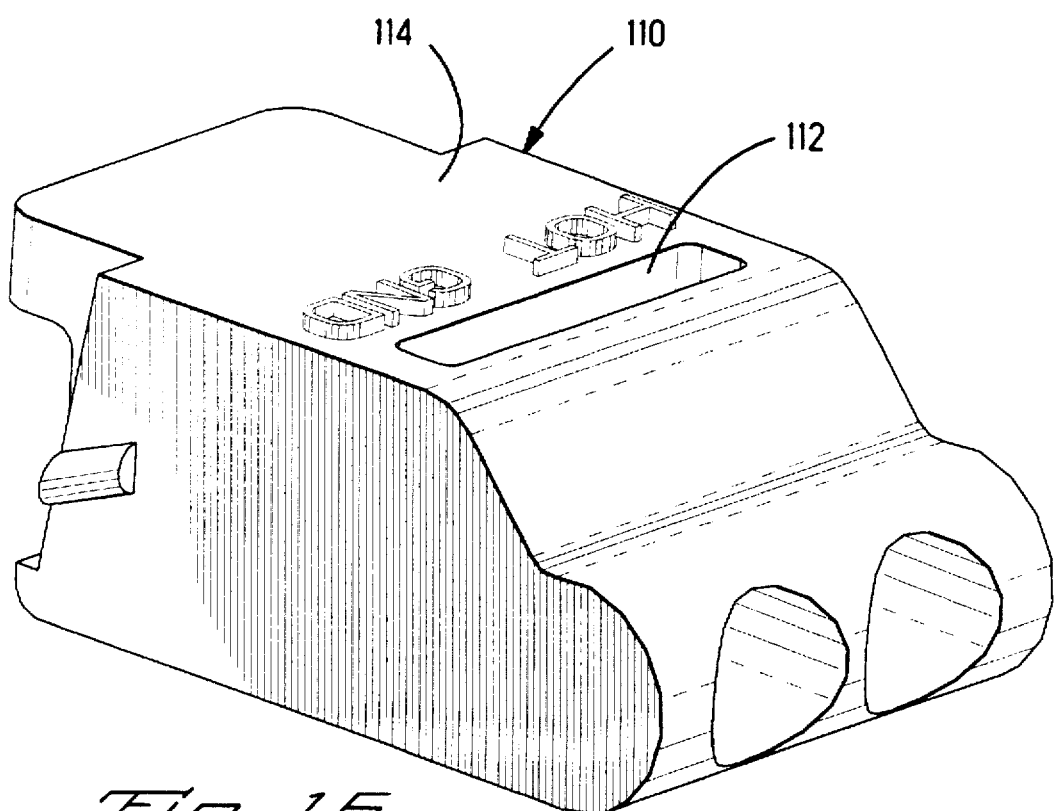
FIG. 16 is a perspective view of the alternate embodiment of the wire carrier.

FIGS. 15 and 16 show an alternate embodiment of the wire carrier 110. The wire carrier 110 is similar to wire carrier 16 in all respects except that the wire carrier 110 has a tool assist slot 112 along the upper surface 114 which extends downwardly from the top surface 114. The tool assist slot is designed to receive the head of a screw driver or a similar tool and is used to assist in the termination and untermination of the wires "W". Even though the wire carrier 110 is designed to be operated without the use of tools, there may be circumstances in which it may be necessary or helpful to use a tool to rotate the wire carrier. The head of a tool is inserted into the tool assist slot 112 and used as a lever to rotate the wire carrier either upward or downward and thereby terminate or unterminate the wires "W".

The advantages of the present invention are that the power tap connector can be mounted in such a manner that the tap box can be sealed from the elements. Further, the power tap connector allows the wires to be terminated and unterminated without the use of tools.

Further, the power tap connector has been specifically described for electrically connecting power wires, but it can be equally applicable for connecting signal wires of the telephone system such as tip and ring lines.

The power tap connector of the present invention and many of the attendant advantages will be understood from the foregoing description. It is apparent that various changes may be made in the form, construction, and arrangement of parts thereof without departing from the spirit or scope of the invention, or sacrificing all of its material advantages.

We claim:

1. In an electrical connector of the type for terminating a conductor by insulation displacement, the connector including a housing for receiving at least one upstanding IDC terminal, said housing having rear and front wall segments with openings formed therein, a pivotally mounted wire carrier having front and rear faces arranged on said housing, said wire carrier being pivotal from a first conductor unterminated position to a second conductor terminated position, said wire carrier having a conductor receiving opening extending from said front face to said rear face, said conductor receiving opening being in communication with said front and rear wall openings throughout a motion of the wire carrier between said unterminated and terminated positions, and an IDC terminal receiving slot in communication with each said opening, whereby an insulated conductor may be positioned for termination to the IDC terminal within said opening by entry thereto through either said front face or said rear face.

2. The power tap connector of claim 1, wherein the wire carrier has a curved rearward face which acts as a pivot member about which the wire carrier rotates.

3. The power tap connector of claim 1, wherein the housing has walls which form an area for receiving the wire carrier, the wire carrier being received within the housing between opposing walls.

4. The power tap connector of claim 3, wherein the wire carrier has a cam follower disposed along a sidewall therefor, the walls having a recess adjacent the area for receiving the wire carrier, the cam follower cooperating with the recess and the wall to support the wire carrier in the unterminated position and the terminated position.

5. The power tap connector of claim 4, wherein the wire carrier has a front shoulder and the wall has a stop, the front shoulder engages the stop when the wire carrier is in the unterminated position to prevent the wire carrier from being rotated further upwardly.

6. The power tap connector of claim 1, wherein the IDC terminals have split beam legs for receiving the insulated conductor therebetween, and a solder tail for providing termination to a circuit board.

7. The power tap connector of claim 5, wherein the IDC terminal is secured within the housing and the solder tail extends below a bottom of the housing, the split beam legs extend into an area for receiving the wire carrier and into the slots within the wire carrier.

8. The power tap connector of claim 1, wherein the IDC terminal has split beam legs on one end and a flat bladed end on another end, the flat bladed end acting as a tab contact for electrical connection with a matable contact.

9. The power tap connector of claim 8, wherein the housing has lateral extensions with mounting holes therein for securing the housing to a panel.

10. The power tap connector of claim 3, wherein the housing has several walls defining a plurality of areas for receiving the wire carriers, a plurality of the wire carriers being disposed within the areas for receiving the wire carriers.

11. An electrical connector for terminating an insulated wire comprising:

a housing having a wire carrier receiving area, an insulation displacement terminal mounted in the housing and extending into the wire carrier receiving area, and;

a wire carrier having front and rear faces, a wire receiving passageway extending through the front and rear faces and a terminal receiving slot in communication with the wire receiving passageway, the wire carrier being pivotally mounted to the base such that the wire receiving passageway is in communication with the terminal receiving slot as the wire carrier is pivoted from an unterminated position to a terminated position whereby an insulated conductor may be positioned for termination to the IDC terminal within said passageway by entry thereto through either said front face or said rear face at any pivoted location of the wire carrier.

* * * * *